United States Patent
Tatoulian et al.

(10) Patent No.: US 11,253,835 B2
(45) Date of Patent: Feb. 22, 2022

(54) DIPHASIC GAS/LIQUID PLASMA REACTOR

(71) Applicants: Paris Sciences et Lettres, Paris (FR); Centre National de la Recherche Scientifique (CNRS), Paris (FR); Sorbonne Universite, Paris (FR)

(72) Inventors: Michael Tatoulian, Paris (FR); Stéphanie Ognier, Paris (FR); Mengxue Zhang, Paris (FR)

(73) Assignees: Paris Sciences et Lettres, Paris (FR); Centre National de la Recherche Scientifique (CNRS), Paris (FR); Sorbonne Universite, Paris (FR)

( * ) Notice: Subject to any disclaimer, the term of this patent is extended or adjusted under 35 U.S.C. 154(b) by 531 days.

(21) Appl. No.: 16/060,605

(22) PCT Filed: Dec. 9, 2016

(86) PCT No.: PCT/EP2016/080475
§ 371 (c)(1),
(2) Date: Jun. 8, 2018

(87) PCT Pub. No.: WO2017/097996
PCT Pub. Date: Jun. 15, 2017

(65) Prior Publication Data
US 2018/0369778 A1    Dec. 27, 2018

(30) Foreign Application Priority Data
Dec. 11, 2015   (EP) .................................. 15306987

(51) Int. Cl.
*B01J 19/00*    (2006.01)
*B01J 19/08*    (2006.01)
*B01J 19/24*    (2006.01)

(52) U.S. Cl.
CPC ......... *B01J 19/0093* (2013.01); *B01J 19/088* (2013.01); *B01J 19/249* (2013.01);
(Continued)

(58) Field of Classification Search
CPC .... B01J 19/0093; B01J 19/088; B01J 19/249; B01J 2219/00783; B01J 2219/00831;
(Continued)

(56) References Cited

U.S. PATENT DOCUMENTS

2002/0014400 A1*   2/2002   Zadiraka ............ B01D 17/0205
                                                                    204/158.2
2006/0034736 A1    2/2006   Miura et al.
(Continued)

FOREIGN PATENT DOCUMENTS

GB      2466664 A        7/2010
JP      2004-522455 A    7/2004
(Continued)

OTHER PUBLICATIONS

Bartolo et al. "Microfluidic stickers", Lab Chip, vol. 8, No. 2, p. 274-279, Jan. 2008.
(Continued)

*Primary Examiner* — Dean Kwak
(74) *Attorney, Agent, or Firm* — Banner & Witcoff, Ltd.

(57) ABSTRACT

The present invention relates to a microfluidic or millifluidic device (1) comprising: —a support (2) made at least partially of a dielectric material, the support (2) comprising a first inlet (21*a*) adapted to be connected to a first reservoir containing gas, a second inlet (21*b*) adapted to be connected to a second reservoir containing liquid, an outlet (22) adapted to be connected to a receiver container containing gas and/or liquid, and a main microchannel or millichannel (3) present in the dielectric material allowing the liquid and the gas to flow from the inlets towards the outlet, —one or (Continued)

several ground electrode(s) (4) embedded in said dielectric material and extending along the main microchannel or millichannel (3), and —one or several high-voltage electrode(s) (5) embedded in said dielectric material and extending along the main microchannel or millichannel (3), wherein the high-voltage electrode(s) (5) and the ground electrode(s) (4) are located on opposite sides of the main microchannel or millichannel (3) so as to be able to generate an electric field inside the main microchannel or millichannel (3). The present invention relates also to a method for generating a plasma in a continuous manner using such a microfluidic or millifluidic device (1).

14 Claims, 14 Drawing Sheets

(52) U.S. Cl.
CPC .................. *B01J 2219/0086* (2013.01); *B01J 2219/00783* (2013.01); *B01J 2219/00831* (2013.01); *B01J 2219/00833* (2013.01); *B01J 2219/00853* (2013.01); *B01J 2219/00894* (2013.01); *B01J 2219/0884* (2013.01); *B01J 2219/0894* (2013.01); *B01J 2219/249* (2013.01); *B01J 2219/2488* (2013.01)

(58) Field of Classification Search
CPC .... B01J 2219/00833; B01J 2219/00853; B01J 2219/0086; B01J 2219/00894; B01J 2219/0884; B01J 2219/0894; B01J 2219/2488; B01J 2219/249
See application file for complete search history.

(56) References Cited

U.S. PATENT DOCUMENTS

2008/0108122 A1  5/2008  Paul et al.
2011/0286893 A1* 11/2011 Zimmerman ......... C01B 13/115
                                                    422/186.14
2012/0160680 A1*  6/2012  Fan ................... B01L 3/502792
                                                    204/451

FOREIGN PATENT DOCUMENTS

WO        02/089612 A1   11/2002
WO      2012/177762 A2   12/2012

OTHER PUBLICATIONS

Schelcher et al. "Cyclic olefin copolymer plasma millireactors", Lab Chip, vol. 14, No. 16, p. 3037-3042, 2014.
Siegel et al. "Cofabrication of Electromagnets and Microfluidic Systems in Poly(dimethylsiloxane)", Angew. Chem., vol. 118, No. 41, p. 7031-7036, Oct. 2006.
Garstecki et al. "Formation of monodisperse bubbles in a microfluidic flow-focusing device", Appl. Phys. Lett., vol. 85, No. 13, p. 2649-2651, Sep. 2004.
Malik, Muhammad A. "Water Purification by Plasmas: Which Reactors are Most Energy Efficient?" Plasma Chem Plasma Process, vol. 30, No. 1, p. 21-31, Nov. 2009.
Yano et al. "Water Treatment by Atmospheric Discharge Produced with Nanosecond Pulsed Power", in IEEE International Power Modulators and High Voltage Conference, Proceedings of the 2008, 2008, pp. 80-83.
Matsui et al. "Experimental and theoretical study of acetic-acid decomposition by a pulsed dielectric-barrier plasma in a gas-liquid two-phase flow", Plasma Sources Sci. Technol. 20 (2011) 034015 (11pp).
Yamanishi, Y. et al., Transportation of Mono-Dispersed Micro-Plasma Bubble in Microfluidic Chip Under Atmospheric Pressure, Trasnducers 2013, Jun. 16, 2013, pp. 1795-1798.

* cited by examiner

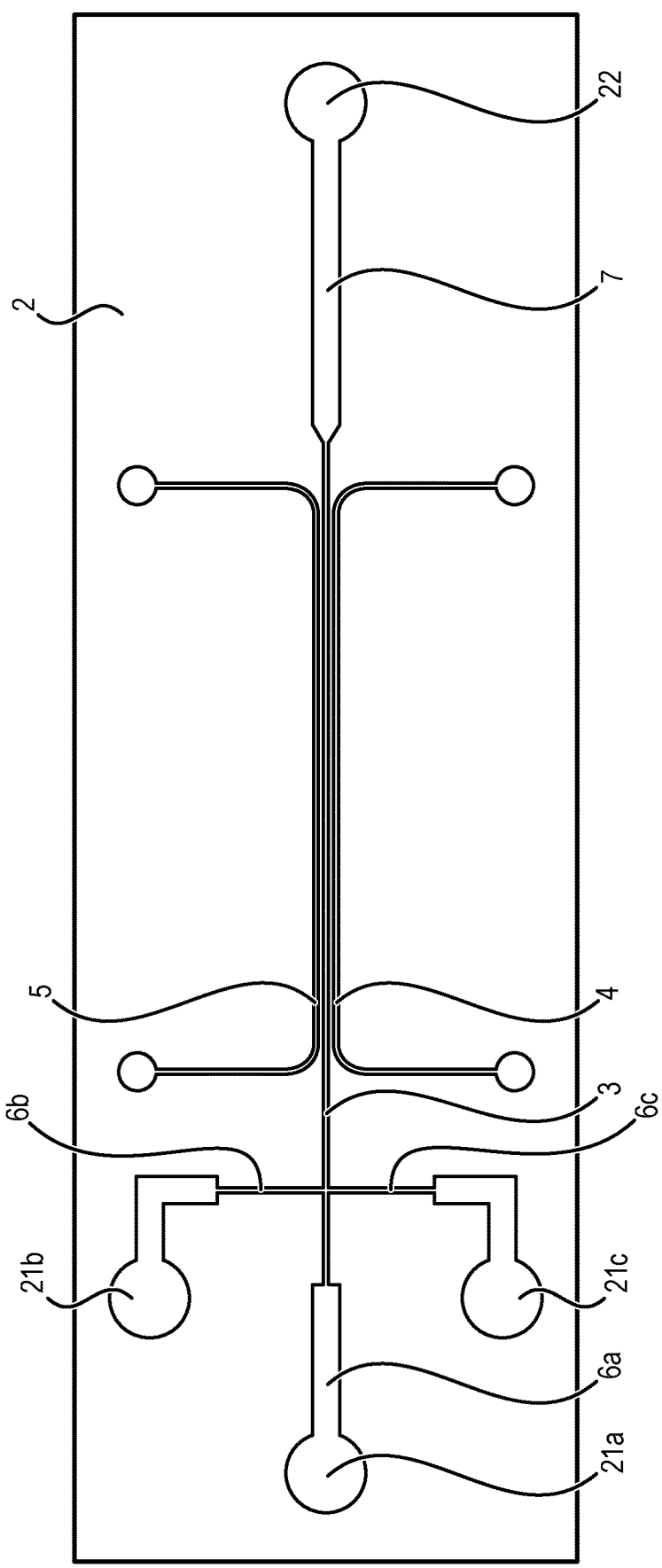

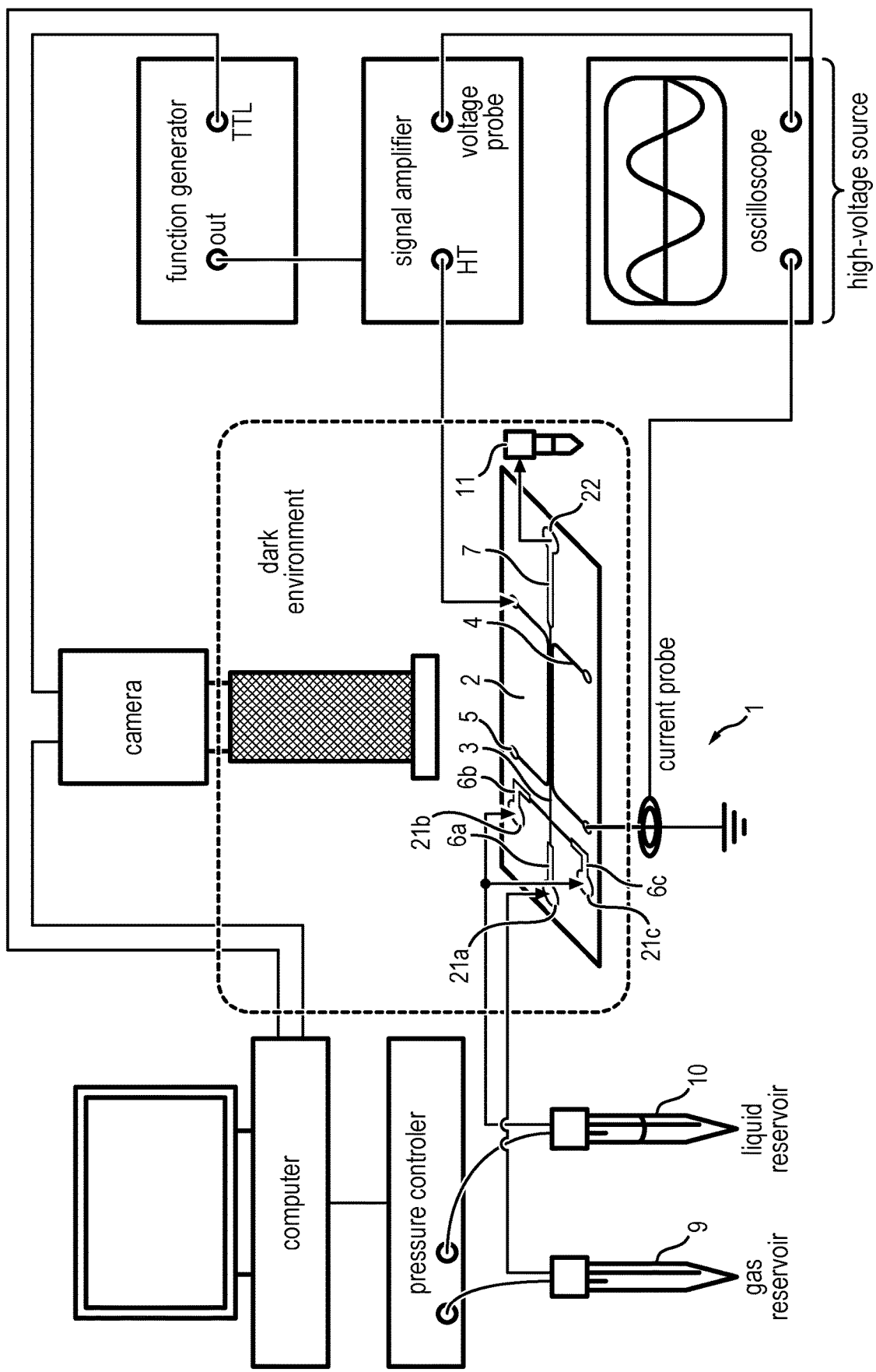

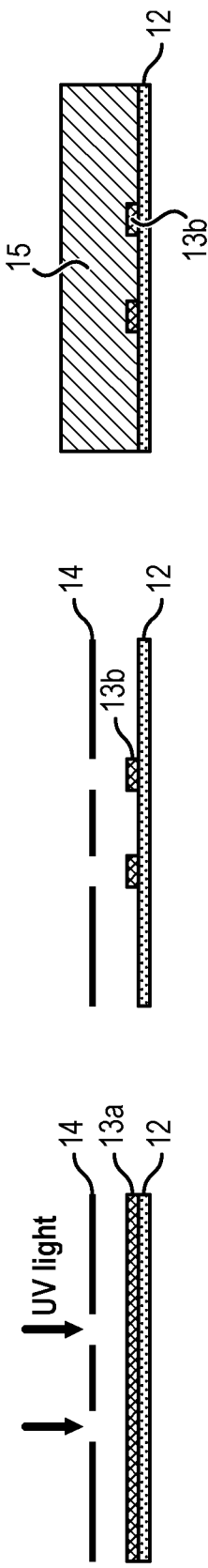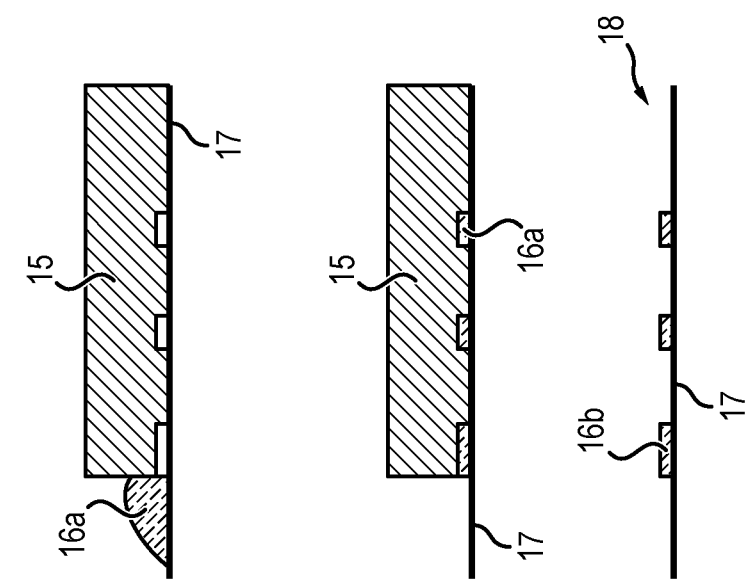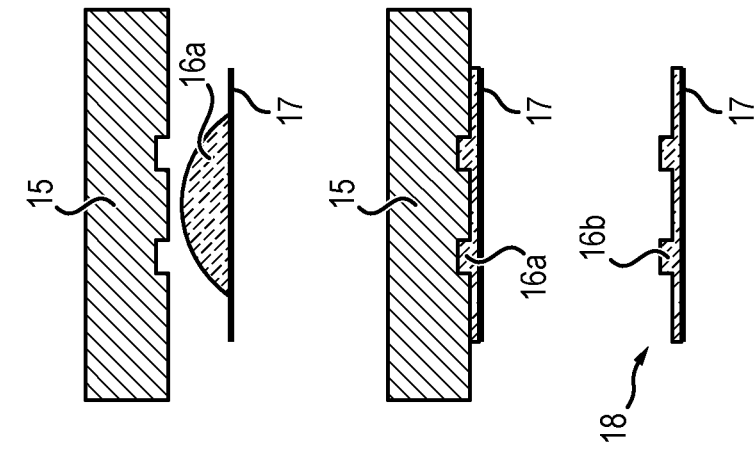
FIG. 6A
FIG. 6B1
FIG. 6B2

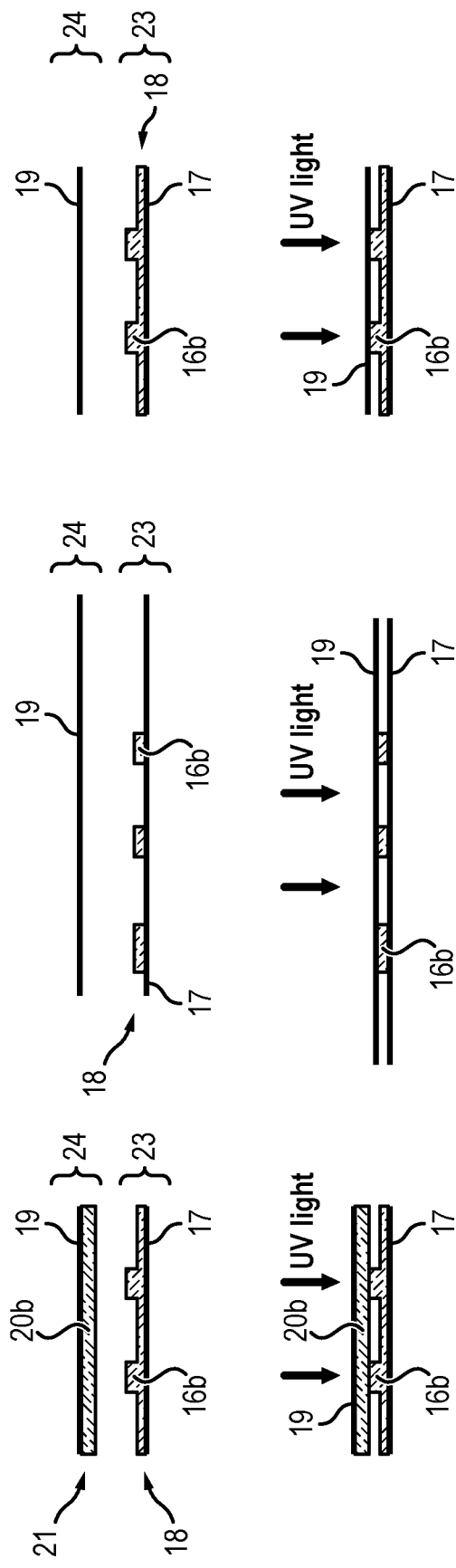

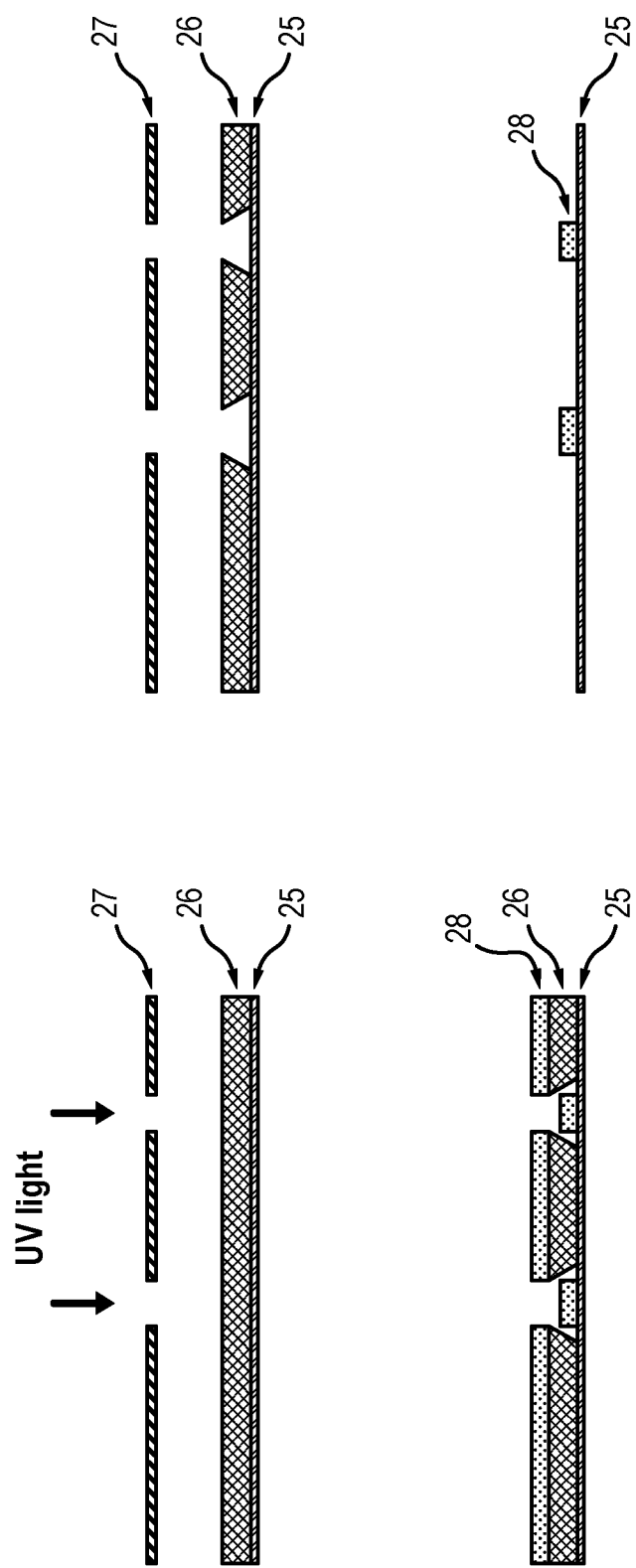

DIPHASIC GAS/LIQUID PLASMA REACTOR

RELATED APPLICATION DATA

This application is a National Stage Application under 35 U.S.C. 371 of co-pending PCT application number PCT/EP2016/080475 designating the United States and filed Dec. 9, 2016; which claims the benefit of EP application number 15306987.7 and filed Dec. 11, 2015 each of which are hereby incorporated by reference in their entireties.

The present invention relates to a microfluidic or millifluidic device useful as a gas-liquid plasma reactor and to a method using such a device for generating a plasma. The microfluidic or millifluidic device according to the invention aims to continuously generate plasma in gas bubbles flowing in a liquid by applying an appropriate electric field so that the reactive species or molecules formed in the plasma can be efficiently transferred into the liquid.

Several documents disclose the use of an electric field in a microfluidic or millifluidic device. Miura et al. described in their patent application [9] a microreactor comprising a main flow channel enabling the blending of two liquids, where a laser is used to accelerate a chemical reaction between the two liquids. An electric and/or magnetic field is then applied at the end of the main flow channel in order to separate and concentrate the reaction production substance. In such a device, the electric field is thus applied after the reaction zone at the end of the main flow channel. In a similar manner, Paul et al. disclosed in their patent application [10] an apparatus comprising a laminated microfluidic structure defining a reactor and a separator to perform chemical synthesis and/or analysis. Such an apparatus can include several electrodes located on opposite sides of the main microchannel in adequate geometries to yield a non-uniform potential gradient. This allows separating materials of different polarizability by electrophoresis or dielectrophoresis (DEP). The electric field is thus applied after the chemical synthesis and/or analysis area at the end of the main microchannel.

However, in these documents, the electric field is used only to separate reaction production substances. It does not allow the generation of a plasma in gas bubbles flowing in a liquid as in the present invention. Besides, no heterogeneous liquid/gas reaction medium is disclosed in these documents.

Several types of gas-liquid plasma reactors have been developed in the past. Most of these devices have been developed with the objective to oxidise pollutants in water. In this case, a key point for the performance of the plasma reactor is the transfer of the reactive species generated in the plasma from gas to liquid. The efficiency of the different types of plasma reactors for transfer of reactive species has been evaluated by Malik et al. [5]. These authors compared 27 different plasma reactors using the energy required to obtain 50% discoloration of dyes in water ($G_{50}$ expressed in g/kWh). Their conclusion was that the most efficient reactors are pulsed powered reactors in which the liquid (i) is sprayed in the plasma zone or (ii) flows down the inner wall of a cylindrical electrode as a thin film. The improvement of efficiency was explained by the large surface-to-volume ratio of the liquid, resulting in a faster rate of transfer of reactive species from gas to liquid and the short distance through which the pollutant molecule in liquid need to diffuse in order to reach the liquid surface.

In gas-liquid plasma reactors where a liquid is sprayed in the discharge zone, a precise control of the process parameters such as residence times of gas and liquid phases is not easy. This is why such reactors have not received so much attention in the last decade. Falling film reactors have attracted more attention. In such reactors, thin films of liquid flows down the inner walls of a cylindrical electrode in the presence of a discharge in the gas between wire-to-cylinder electrodes [6]. The problem of such reactors is that it is difficult to obtain uniform liquid films, especially in the case of thin liquid films (<1 mm).

In order to decompose acetic acid in water, Matsui et al. [7] used another kind of reactor, i.e. a two-phase flow reactor where gas bubbles are injected in a flowing liquid. Pulsed dielectric barrier discharge was generated in oxygen bubbles flowing in water. The reactor consisted in two coaxial glass tubes, the gap between the inner tube and the outer tube being 1 mm. A bubbler at the bottom of the reactor was used to create gas bubbles. Good results were obtained in term of acetic acid decomposition. The drawback of this reactor is however that the two-phase flow is not fully controlled with a large size distribution of the bubbles (from 0.1 to 1 cm) and the presence of preferential paths for the liquid. The consequence is that some parts of the liquid may absorb too much radicals while other parts may lack radicals.

Yamanishi et al. [8] used microfluidic device to transport mono-dispersed micro-plasma bubbles in microfluidic chip under atmospheric pressure. The bubbles are then formed with higher precision and smaller size with such a device. However, because the plasma is generated upstream the diphasic flow, the amount of short-life reactive species transferred from gas to liquid is low.

There exists thus a need for improved gas-liquid plasma reactors in which the formation and reaction of the reactive species formed in the plasma can be better controlled.

The present invention relates thus to a microfluidic or millifluidic device comprising:
- a support made at least partially of a dielectric material, the support comprising a first inlet adapted to be connected to a first reservoir containing gas, a second inlet adapted to be connected to a second reservoir containing liquid, an outlet adapted to be connected to a receiver container containing gas and/or liquid, and a main microchannel or millichannel present in the dielectric material allowing the liquid and the gas to flow from the inlets towards the outlet (notably under pressurized conditions),
- one or several ground electrode(s) embedded in said dielectric material and extending along the main microchannel or millichannel, and
- one or several high-voltage electrode(s) embedded in said dielectric material and extending along the main microchannel or millichannel,
- wherein the high-voltage electrode(s) and the ground electrode(s) are located on opposite sides of the main microchannel or millichannel so as to be able to generate an electric field inside the main microchannel or millichannel, and more particularly a dielectric-barrier discharge (DBD).

Such a device allows the formation of gas bubbles in a flowing liquid phase. Electrical micro-discharges of controlled energy are then generated in said gas bubbles, preferably at a precise frequency, in order to generate a plasma in said gas bubbles in a continuous manner since the electrodes creating electrical micro-discharges extend along the main microchannel or millichannel in which said gas bubbles flow with the liquid. Thus, each time a micro-discharge is created in a gas bubble, a given amount of reactive species (radicals, electrons, excited neutral species, etc.) are formed and transferred into the liquid. With such device, it is thus possible to control the size of bubbles, as well as the density and nature of reactive species. As a consequence, the transfer rate of reactive species into the liquid phase can also be controlled. Such a device allows thus a precise and efficient injection of reactive species into the liquid phase. The device according to the invention can thus be dedicated to plasma-driven chemical synthesis with the aim for example to perform either (i) specific functionalization of molecules or (ii) plasma-induced polymerisation reactions by reaction for example of various molecules present in the liquid with the reactive species formed in the bubbles and transferred into the liquid. Another possible application could be to collect in the liquid phase a small molecule formed in the gas bubbles by reaction of various reactive species which can then be transferred into the liquid phase.

The invention will be described by way of example, with reference to the accompanying drawings in which:

FIGS. 1A and 1B diagrammatically show an upper view of a support according to two distinct possible embodiments of the invention;

FIG. 1C diagrammatically show the junction between injection channels and the main microchannel or millichannel according to an embodiment of the invention;

FIG. 2 diagrammatically shows an upper view of the high-voltage electrode 5 or the ground electrode 4 with the main microchannel or millichannel 3 according to various embodiments of the invention, the electrode 4 or 5 having various possible forms;

FIG. 3 diagrammatically shows various embodiments according to the invention of the ground and high-voltage electrodes 4 and 5 and the main microchannel or millichannel 3;

FIG. 4 diagrammatically shows a microfluidic or millifluidic device according to an embodiment of the invention, allowing notably the visualisation of the formed plasma thanks to the presence of a camera;

FIGS. 5A and 5B diagrammatically illustrate the construction of a channel in the support according to a possible embodiment of the invention;

FIGS. 6A, 6B1, 6B2, 6C1, 6C2 and 6C3 diagrammatically illustrate steps of a method to form a channel in the support according to an embodiment;

FIGS. 7A and 7B diagrammatically illustrate steps of a method to form the electrodes in the support according to an embodiment;

FIG. 8 diagrammatically illustrates the method of generation of a plasma according to the invention;

FIG. 9 diagrammatically shows the geometry of the support used in the examples;

Figure 1A:
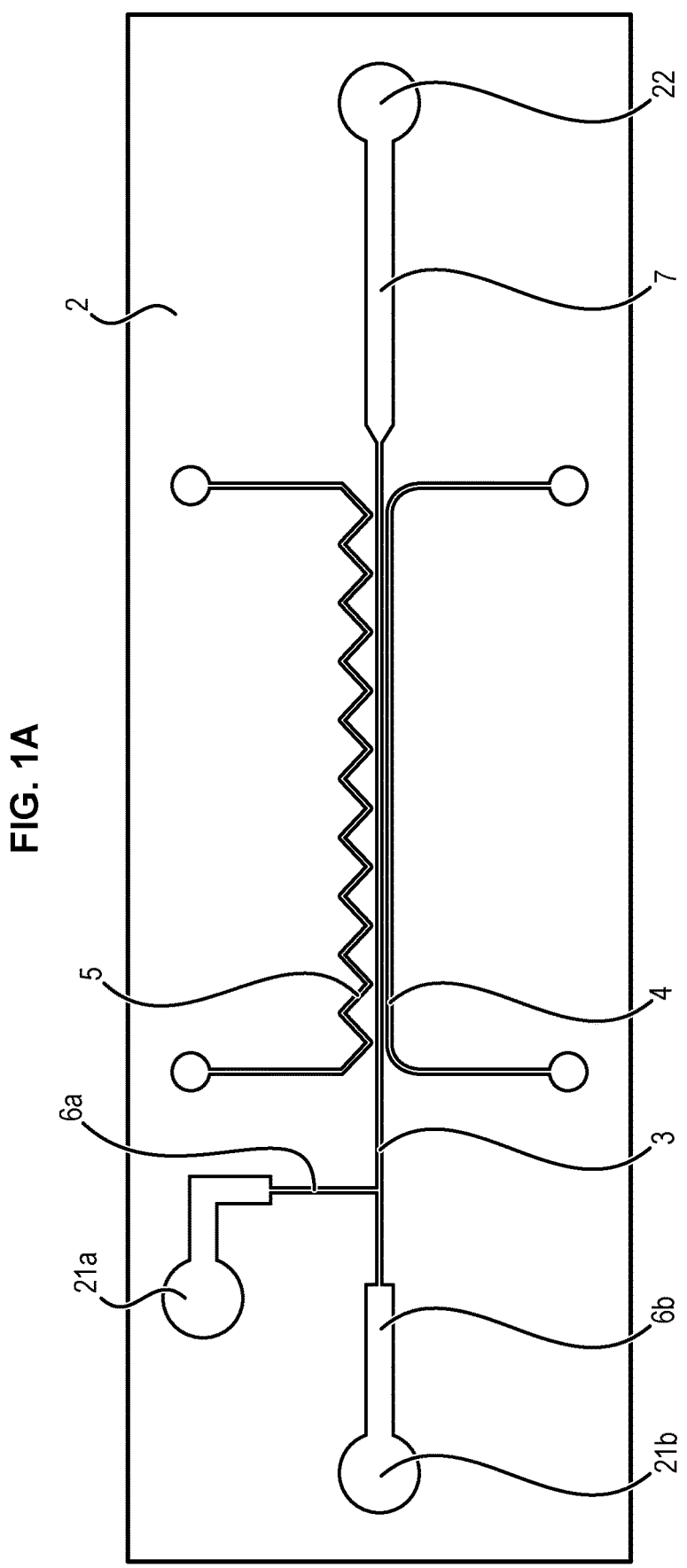

The term "device" will be used herein to designate the "microfluidic or millifluidic device" according to the invention. In the same way, the term "main channel" will be used herein for designating the "main microchannel or millichannel" according to the invention.

Dielectrical Material

The support of the device according to the present invention is made at least partially of a dielectric material (which is thus solid) in order to isolate the device since a high-voltage electric field is created inside the support between the electrodes embedded in said dielectric material and to allow the formation of a plasma in the gas bubbles by dielectric-barrier discharges (DBD). It is why the main channel is present in the dielectric material.

The dielectric material used in the present invention can be any material known for its dielectric properties. However, the dielectric material will be advantageously impervious to gas and liquid which have to flow through a channel comprised in the support. Moreover, the dielectric material should also advantageously allow the formation of the support comprising at least a channel (the main channel) and embedded electrodes.

The dielectric material can thus be a UV-cured polymer (i.e. a polymer obtained by photopolymerisation of monomers or prepolymers), such as a polymer obtained by photopolymerisation of a thiol-ene based resin (for example a Norland Optical Adhesive® (NOA), such as NOA-81 or NOA-61, preferably NOA-81), a poly(tetramethylene succinate) (PTMS), a cyclic olefin copolymer (COC) such as a copolymer of ethylene and norbornene or tetracyclododecene, glass or a combination thereof.

Main Channel

This support comprises a microchannel or millichannel, which is preferably a straight microchannel or millichannel.

By "microchannel or millichannel" is meant in the present invention a channel having a cross section which has a dimension (in particular a width) in the micrometer or millimeter range. Thus, a microchannel will be a channel having a cross section which has a dimension (in particular a width) in the micrometer range, whereas a millichannel will be a channel having a cross section which has a dimension (in particular a width) in the millimeter range. Typically, the microchannel or millichannel will have a width and a depth comprised between 1 μm and 10 mm, notably between 10 μm and 5 mm, preferably between 100 μm and 3 mm.

The width of the main microchannel will be more particularly comprised between 1 and 1000 μm, notably between 10 and 500 μm, preferably between 100 and 300 μm and the depth of the main microchannel will be more particularly comprised between 10 μm and 2 mm, notably between 50 μm and 1 mm, preferably between 70 μm and 200 μm The width of the main millichannel will be more particularly comprised between 1 and 10 mm, notably between 1 and 5 mm, preferably between 1 and 3 mm and the depth of the main millichannel will be more particularly comprised between 10 μm and 2 mm, notably between 50 μm and 2 mm, preferably between 100 μm and 2 mm.

The length of the microchannel or millichannel however can be in the centimeter or decimeter range.

Electrodes

The device according to the invention comprises at least one ground electrode and at least one high-voltage electrode.

By "ground electrode" (also called earth electrode) is meant an electrode which is connected to the ground.

By "high-voltage electrode" is meant an electrode which is connected to a high-voltage source, the high-voltage source being advantageously a source of high voltage between 1 kV and 30 kV, notably between 5 kV and 20 kV, preferably between 10 kV and 15 kV.

The ground electrode(s) and the high-voltage electrode(s) are made with an electrical conductor material, such as indium (In), tin (Sn), copper (Cu), gold (Au) or oxides and/or alloys thereof, in particular indium tin oxide (ITO), copper (Cu), gold (Au) or indium-tin alloy (In—Sn), more particularly an indium-tin alloy. The ground electrode(s) and the high-voltage electrode(s) can be made with an identical or different electrical conductor material.

The ground electrode(s) can be constituted with one or several ground electrode(s) extending along the main channel. Each ground electrode can have various forms. It can be a plane electrode, an electrode having a zig-zag form, a plane electrode with fin(s) and/or tip(s) which extend towards the main channel, etc.

In the same way, the high-voltage electrode(s) can be constituted with one or several high-voltage electrode(s) extending along the main channel. Each ground electrode can have various forms. It can be a plane electrode, an electrode having a zig-zag form, a plane electrode with fin(s) and/or tip(s) which extend towards the main channel, etc. In particular, it is a plane electrode.

The ground electrode(s) and the high-voltage electrode(s) can have identical or different forms.

FIGS. 2A to 2B diagrammatically shows an upper view of the high-voltage electrode 5 or the ground electrode 4 extending along the main microchannel or millichannel 3 according to various embodiments of the invention, the electrode 5 or 4 having various possible forms. Thus FIG. 2A represents a plane electrode 5 or 4 extending along the main channel 3, FIG. 2B represents a zig-zag electrode 5 or 4 extending along the main channel 3 and FIG. 2C represents a plane electrode 5 or 4 with fin(s) and/or tip(s) which extend towards the main channel 3. Other forms could however be envisaged.

According to a particular embodiment, there are one ground electrode, in particular a plane ground electrode, and one or several high-voltage electrode(s) extending along the main channel.

According to another embodiment, there are one high-voltage electrode, in particular a plane high-voltage electrode, and one or several ground electrode(s) extending along the main channel.

According to a preferred embodiment, there are one ground electrode and one high-voltage electrode extending along the main channel. According to a most preferred embodiment, the ground electrode and the high-voltage electrode are plane electrodes.

FIGS. 3A to 3D diagrammatically show various embodiments according to the invention of the high-voltage and ground electrodes 5 and 4 and the main channel 3. Thus FIG. 3A represents an embodiment in which there are one high-voltage electrode 5 and one ground electrode 4 extending along the main channel 3, FIG. 3B represents an embodiment in which there are one high-voltage electrode 5 and several ground electrodes 4 extending along the main channel 3, FIG. 3C represents an embodiment in which there are several high-voltage electrodes 5 and several ground electrodes 4 extending along the main channel 3 and FIG. 3D represents an embodiment in which there are several high-voltage electrodes 5 and one ground electrode 4 extending along the main channel 3. Other embodiments could however be envisaged. In these figures, the electrodes 4 and 5 have been represented as plane electrodes for practical reasons. However, other forms could be envisaged such as those represented on FIG. 2.

Advantageously, the distance between the high-voltage electrode(s) and the ground electrode(s) will be comprised between 500 µm and 10 mm, notably between 500 µm and 5 mm, preferably between 500 µm and 2 mm. Smaller distances are preferred, notably between 500 µm and 1000 µm in order to have a low breakdown voltage which is less energy-consuming. This distance depends also on the width of the main channel which is present between the two electrodes.

Advantageously, the distance between the high-voltage electrode(s) or the ground electrode(s) and the main channel will be comprised between 10 µm and 2 mm, notably between 50 µm and 1 mm, preferably between 100 µm and 1 mm.

Advantageously, the high-voltage electrode(s) extend(s) along the main microchannel or millichannel 3 on a distance of at least 1 cm, notably at least 2 cm, for example comprised between 1 cm and 10 cm, in particular comprised between 2 cm and 5 cm.

Advantageously, the ground electrode(s) extend(s) along the main microchannel or millichannel 3 on a distance of at least 1 cm, notably at least 2 cm, for example comprised between 1 cm and 10 cm, in particular comprised between 2 cm and 5 cm.

Microfluidic or Millifluidic Device

The support of the device comprises a first inlet and a second inlet respectively adapted to be connected to a first reservoir adapted to contain gas and to a second reservoir adapted to contain liquid. The support also comprises an outlet adapted to be connected to a receiving container adapted to contain gas and/or liquid.

Thus, the device according to the invention further contains a first reservoir adapted to contain gas, and more particularly pressurized gas in order to allow the injection of gas in the support from the first reservoir and its flow through the main channel, and a second reservoir adapted to contain liquid, and more particularly pressurized liquid in order to allow the injection of liquid in the support from the second reservoir and its flow through the main channel. The device also further contains a receiving container adapted to contain gas and/or liquid in order to collect the gas and/or liquid obtained at the end of the main channel.

The outlet of the support allows the exit of the gas and/or liquid obtained at the end of the main channel outside of the support. The outlet is thus connected to the main channel by any means allowing the flow of gas and liquid from the main channel to the outlet, such as by an outlet channel (of any form and size—advantageously it is a microchannel or millichannel).

The inlets of the support allow the entry into said support of gas and liquid from the corresponding reservoirs. The inlets are then connected to the main channel by means allowing the flow of gas and liquid until the main channel and in which the gas bubbles are formed into the liquid.

Various methods can be used to form the gas bubbles into the liquid. For example, pulsed pressure can be applied to the gas to form gas bubbles into the liquid. A flow focusing design can also be used for the generation of gas bubbles into the liquid as described in Garstecki et al. [4]. This implies the shearing of a gas flow by two contrary liquid flows and thus a second liquid inlet. This second embodiment using a flow focusing design is preferred since it allows the formation of bubbles with a controlled form (substantially spherical bubbles), a controlled size and a controlled circulation speed.

Advantageously, the two inlets 21a and 21b are respectively connected to two injection channels 6a and 6b, advantageously a microchannel or millichannel. The two injection channels 6a and 6b are then connected to the main microchannel or millichannel 3.

By "injection channel" is meant in the present invention a channel allowing the entry of liquid or gas into the microfluidic or millifluidic device 1 through one of its inlets.

The liquid or gas thus entered can then reach the main microchannel or millichannel 3.

The two injection channels 6a and 6b will be connected to the two inlets 21a and 21b and to the main microchannel or millichannel 3 in a way to ensure the entry of liquid and gas in the microfluidic or millifluidic device 1 and the formation of gas bubbles in the liquid, in particular with controlled dimensions and frequency.

According to a first embodiment, the support comprises:
- a first injection channel, advantageously a microchannel or millichannel, connecting the first inlet to the main channel, and
- a second injection channel, advantageously a microchannel or millichannel, connecting the second inlet to the main channel, wherein the first and second channels meet the main channel at a junction, and wherein the second channel and the main channel advantageously are a continuation of each other.

Such a first embodiment can be used to form gas bubbles in liquid at the junction of first, second and main channels.

Such an embodiment is diagrammatically illustrated on FIG. 1A with point-to-plane electrodes. The support 2 made of a dielectric material comprises then:
- a first inlet 21a adapted to be connected to a first reservoir containing gas,
- a second inlet 21b adapted to be connected to a second reservoir containing liquid,
- an outlet 22 adapted to be connected to a receiver container containing gas and/or liquid,
- a main microchannel or millichannel 3 allowing the liquid and the gas to flow from the inlets 21a and 21b towards the outlet 22,
- one or several ground electrode(s) 4 (one plane ground electrode being represented on FIG. 1A) embedded in said dielectric material and extending along the main microchannel or millichannel 3,
- one or several high-voltage electrode(s) 5 (one zig-zag high-voltage electrode being represented on FIG. 1A) embedded in said dielectric material and extending along the main microchannel or millichannel 3,
- a first injection channel 6a, advantageously a microchannel or millichannel, connecting the first inlet 21a to the main channel 3,
- a second injection channel 6b, advantageously a microchannel or millichannel, connecting the second inlet 21b to the main channel 3, and
- an outlet channel 7, advantageously a microchannel or millichannel, connecting the outlet 22 to the main channel 3.

According to a second embodiment, the support comprises also a third inlet adapted to be connected to the second reservoir or to a third reservoir adapted to contain liquid, in particular for allowing the generation of gas bubbles by a flow focusing design. Thus, according to this preferred embodiment, the device can further contain a third reservoir adapted to contain liquid, and more particularly pressurized liquid.

In this second embodiment, the support will advantageously comprise:
- a first injection channel, advantageously a microchannel or millichannel, connecting the first inlet to the main channel,
- a second injection channel, advantageously a microchannel or millichannel, connecting the second inlet to the main channel, and
- a third injection channel, advantageously a microchannel or millichannel, connecting the third inlet to the main channel, wherein first, second and third injection channels meet the main channel at a junction, and wherein, at said junction, each of the second and third injection channels extends perpendicularly relative to the first injection channel, the second injection channel and the third injection channel being a continuation of each other. Advantageously, the first injection channel and the main channel are a continuation of each other.

Such an embodiment is diagrammatically illustrated on FIG. 1B with plane-to-plane electrodes. The support 2 made of a dielectric material comprises then:
- a first inlet 21a adapted to be connected to a first reservoir containing gas,
- a second inlet 21b adapted to be connected to a second reservoir containing liquid,
- a third inlet 21c adapted to be connected to the second reservoir or a third reservoir containing liquid,
- an outlet 22 adapted to be connected to a receiver container containing gas and/or liquid,
- a main microchannel or millichannel 3 allowing the liquid and the gas to flow from the inlets 21a, 21b and 21c towards the outlet 22,
- one or several ground electrode(s) 4 (one plane ground electrode being represented on FIG. 1B) embedded in said dielectric material and extending along the main microchannel or millichannel 3,
- one or several high-voltage electrode(s) 5 (one plane high-voltage electrode being represented on FIG. 1B) embedded in said dielectric material and extending along the main microchannel or millichannel 3,
- a first injection channel 6a, advantageously a microchannel or millichannel, connecting the first inlet 21a to the main channel 3,
- a second injection channel 6b, advantageously a microchannel or millichannel, connecting the second inlet 21b to the main channel 3,
- a third injection channel 6c, advantageously a microchannel or millichannel, connecting the third inlet 21c to the main channel 3, and
- an outlet channel 7, advantageously a microchannel or millichannel, connecting the outlet 22 to the main channel 3.

Figure 1C:
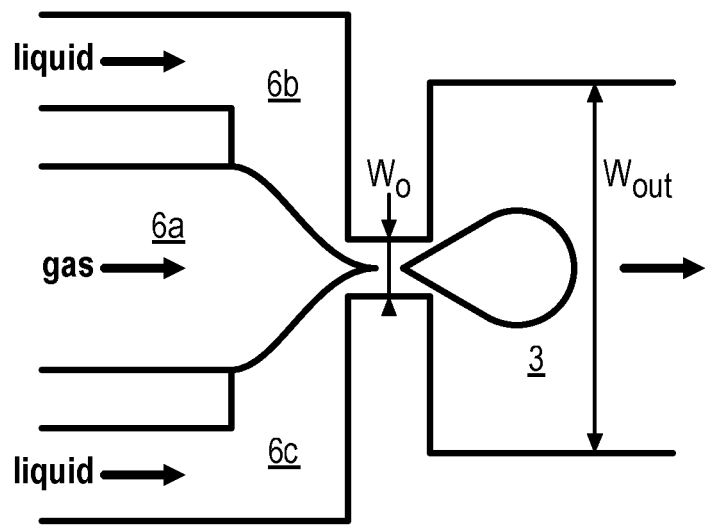

FIG. 1C further shows a preferred embodiment of the junction between the three injection channels 6a, 6b and 6c and the main channel 3 according to the above mentioned second embodiment (flow focusing design) [4]. Indeed, in order to better control the size of the bubbles at this junction, the width of the main channel at the junction ($W_o$) where the gas bubbles are formed is advantageously not larger, and notably smaller, than the width of the main channel after this junction ($W_{out}$) where the gas bubbles flow into the liquid.

Advantageously, the microfluidic or millifluidic device 1 will further comprise a high-voltage power source connected to the ground electrode(s) 4 and the high-voltage electrode(s) 5.

This high-voltage power source aims to apply a high voltage between ground electrode(s) 4 and high-voltage electrode(s) 5 and to generate an electric field inside the main microchannel or millichannel 3. In particular, this high-voltage power source has to be able to provide sufficient power to the gas bubbles which will circulate inside the main microchannel or millichannel 3, in order to create a dielectric-barrier discharge (DBD) having appropriate energy and generate a plasma in the bubbles in a continuous manner.

The high voltage provided by the high-voltage power source is typically comprised between 1 kV and 30 kV, notably between 5 kV and 20 kV, preferably between 10 kV and 15 kV.

According to a first embodiment, the high-voltage power source is a variable high-voltage power source, i.e. providing a variable high-voltage. The high voltage provided by the high-voltage power source will be more particularly a sinusoidal high voltage with a frequency comprised advantageously between 1 Hz and 10 MHz, in particular comprised between 100 Hz and 1 MHz, preferably comprised between 100 Hz and 10 kHz. This allows generating electrical micro-discharges in the gas bubbles at a precise frequency. Advantageously, this frequency will be adapted to the conditions of the experiment, such as the nature of the gas, the circulation speed of the bubbles, the kinetics of target reactions, etc. In this case, the high voltage (peak to peak voltage) is typically comprised between 1 kV and 30 kV, notably between 5 kV and 20 kV, preferably between 10 kV and 15 kV.

According to a second embodiment, the high-voltage power source is a high-voltage pulsed power source, i.e. providing a pulsed high-voltage. In this case, the applied voltage is high only during pulses of short duration, typically 0.001 to 1 microseconds, with a frequency comprised advantageously between 1 Hz and 10 MHz, in particular comprised between 100 Hz and 1 MHz, preferably comprised between 100 Hz and 10 kHz. In this case, the high voltage (peak to peak voltage) is typically comprised between 1 kV and 30 kV, notably between 5 kV and 20 kV, preferably between 10 kV and 15 kV.

FIG. 4 diagrammatically shows a microfluidic or millifludic device 1 according to an embodiment of the present invention comprising a support 2 according to the embodiment illustrated on FIG. 1B. The inlet 21a of the support 2 is connected to a gas reservoir 9, whereas inlets 21b and 21c of the support 2 are connected to a liquid reservoir 10. The outlet 22 of the support 2 is connected to a receiving container 11. This device 1 can be monitored by a computer in order to monitor:
- a pressure controller which controls the pressure in the device,
- a high-voltage source which can be composed of various apparatuses such as a function generator, a signal amplifier and an oscilloscope, and
- optionally a camera (such as an iCCD camera or a CCD camera), if need be, to visualize the electric discharges in the bubbles or the flow of bubbles in channel 3.

Manufacture of the Support

The support according to the present invention can comprise a lower part and an upper part. Typically, the lower part is engraved with grooves allowing the formation of channels when the lower part is covered with the upper part. These channels can be the channels through which gas (optionally in the form of bubbles) and liquid flow (main channel, injection channel, outlet channel) or can also be filled with an electrical conductor material through holes present on the upper part of the support in order to form the electrodes, for instance by microsolidics technique.

The channels will have typically a rectangular cross section and thus be constituted of four walls, i.e. one bottom wall, one top wall and two lateral walls. The bottom wall and the lateral walls are constituted by the walls of the groove, whereas the top wall is part of the surface of the upper part.

The lower and upper parts can be made in any dielectric material as defined previously. The lower and upper parts can be made in distinct dielectric materials, which can be a combination of dielectric materials.

Figure 5A:
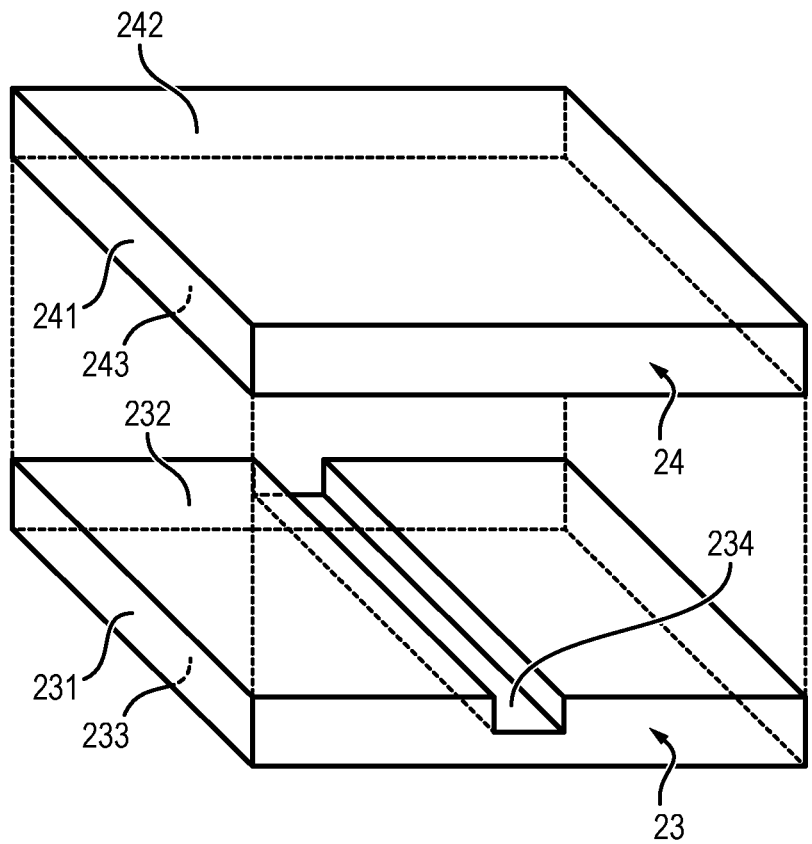
Figure 5B:
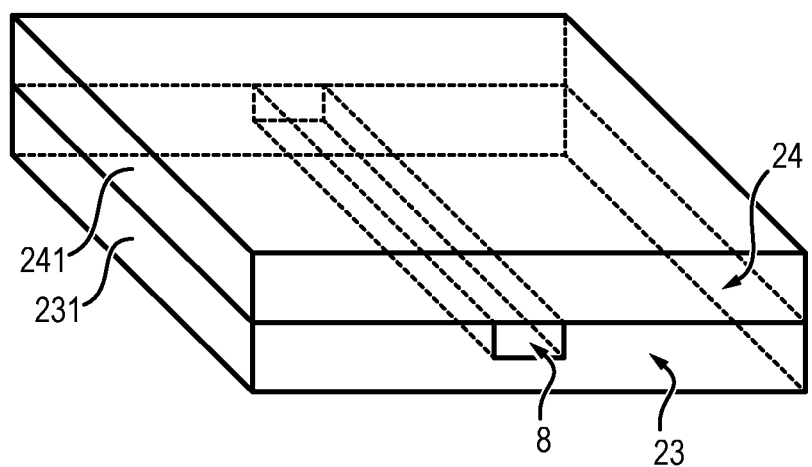

FIGS. 5A and 5B illustrate the construction of a channel in the support which can be the main channel 3, an injection channel 6a, 6b or 6c, an outlet channel 7 or a channel which will be filled with an electrical conductor material to form the ground electrode 4 or the high-voltage electrode 5.

In the example illustrated on these figures, the support 2 (only a small part being represented) comprises a lower part 23 and an upper part 24. The lower part 23 comprises a layer 231 of material (made of a dielectric material or a combination of dielectric materials) having an upper face 232 and a lower face 233. The upper face 232 comprises a groove 234 in the layer 231 of material.

The upper part 24 comprises a layer 241 of material (made of a dielectric material or a combination of dielectric materials) having an upper face 242 and a lower face 243. The upper part 24 is intended to be mounted on the lower part 23 as shown on FIG. 5B, so as to close the groove 234, in order to form a channel 8. More precisely, the upper part 24 is positioned with its lower face 243 in contact with the upper face 232 of the lower part 23. The upper part 24 is sealed on the lower part 23.

Once the upper part 24 is mounted on the lower part 23 (FIG. 5B), the groove 234 defines a microchannel 8 extending between the lower part 23 and the upper part 24. The surface of the microchannel 8 is defined by the inner surface of the groove 234 of the lower part 23 and the lower face 243 of the upper part 24, extending over the groove 234.

The method to form the channels can be any method used in the microfluidic or millifluidic field which is well known to the one skilled in the art, such as a method using NOA-81 as a dielectric material. A method which uses NOA-81 as a dielectric material is illustrated on FIG. 6 as an example of method for forming a channel in a dielectric material and is detailed below. The first step (FIG. 6A) is a step of photolithography. A patterned mask 14 is prepared with black parts corresponding to engraved surfaces and transparent parts corresponding to un-engraved surfaces, these last parts corresponding to the walls of the groove which have to be engraved. This mask is placed above a silicon wafer 12 (Si wafer) covered with a SU-8 photoresist thin layer 13a before being submitted to UV light. The SU-8 areas not covered by the mask (areas corresponding to the transparent parts of the mask) are cross-linked by UV light whereas the SU-8 areas covered by the mask remain soluble and can be washed away after the UV light treatment. This allows obtaining a micro- or milli-patterned cross-linked SU-8 thin layer 13b on a silicon wafer 12 (Si wafer) after washing away the Su-8 not crosslinked by UV-light. A first replica of these micro- or milli-patterns then can be realized by PDMS (polydimethylsiloxane) (RTV) molding after a step of room-temperature vulcanizing to give a mold of PDMS RTV 15 with an engraved scheme of the groove.

Figure 2:
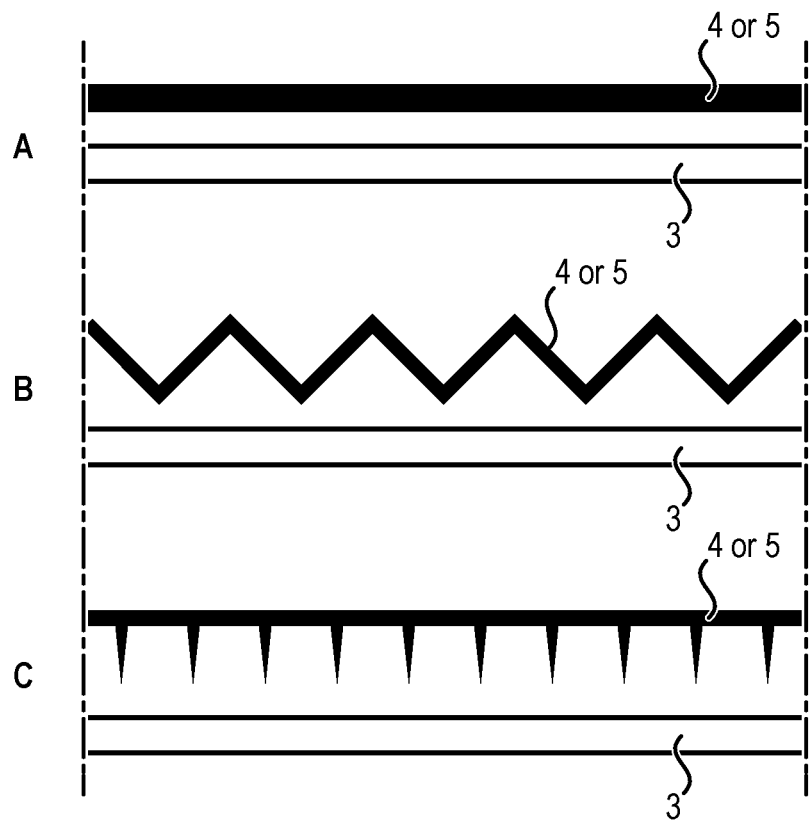
Figure 3:
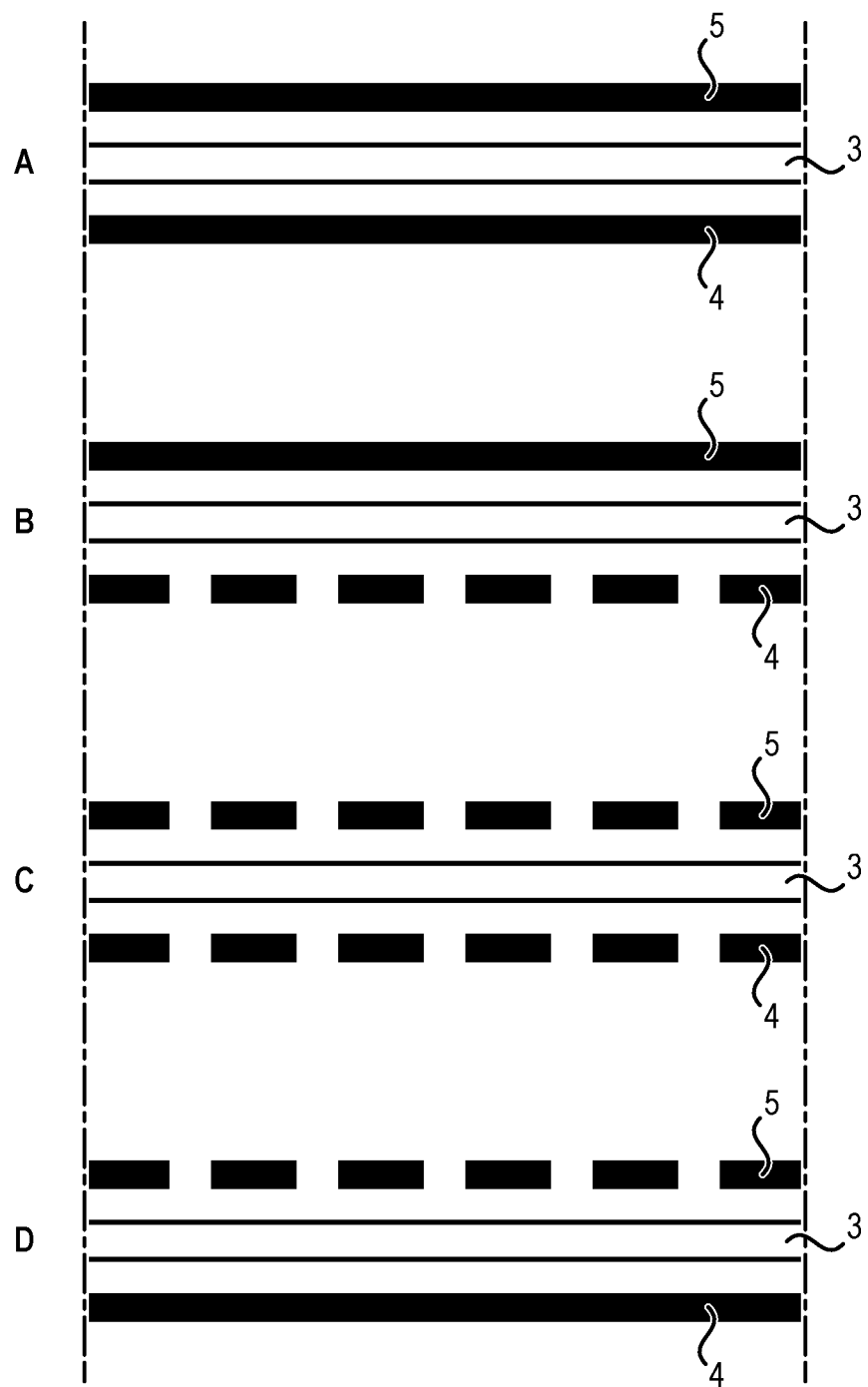

The second step (FIGS. 6B1 and 6B2) consists to make a NOA-81 sticker 18 with micro- or milli-structured patterns (the same pattern as the one obtain with SU-8) from the PDMS mold 15. Two main techniques can be employed for the fabrication of NOA-81 sticker 18, either by stamp technique (FIG. 6B1) or by capillarity technique (FIG. 6B2) [1]. For the stamp technique, NOA-81 liquid 16a is firstly deposited on a rigid substrate 17 (glass slide, Si wafer, etc.). Then the PDMS mold 15 is placed on the NOA-81 liquid 16a, followed by a short treatment with UV light through the PDMS mold 15 to partially insulate the NOA-81 liquid 16a allowing obtaining a partially insulated NOA-81 16b while keeping a thin layer of uncured polymer on the surface which allows the formation of the NOA-81 sticker 18 (FIG. 6B1). For the capillarity technique, the PDMS mold 15 is firstly put in contact with the rigid substrate 17 (glass slide, Si wafer, etc.) before depositing the NOA-81 liquid 16a around the PDMS mold 15. The NOA-81 liquid 16a will fill in the microstructures of the PDMS mold 15, driven by capillary forces. For that, a "porous" structure can be formed at the previous steps by forming the mold of PDMS with kinds of tiny pillars on the areas not corresponding to the final channel areas (small transparent dots are added on the mask to form these tiny pillars) so that the NOA-81 liquid can be driven by capillary forces between these tiny pillars. Then, a short treatment with UV light is then used to obtain the partially insulated NOA-81 16b and thus the NOA-81 sticker 18 (FIG. 6B2).

The third step consists in the assembly of the NOA-81 sticker 18 (the lower part) with an upper part (19+optionally 20b) in order to form the channel 8 (FIGS. 6C1, 6C2 and 6C3). Two assembly methods can be envisaged. The NOA-81 sticker 18 made by either stamp technique or capillary technique may be sealed under UV light with a rigid substrate 19 (such as glass slide) (FIGS. 6C2 and 6C3 respectively) or the NOA-81 sticker 18 made by either stamp technique or capillary technique may also be sealed under UV light with another NOA-81 sticker 21 (comprising a rigid substrate 19 covered with a partially insulated NOA-81 layer 20b) (FIG. 6C1 in the case where the NOA-81 sticker 18 is made by stamp technique—the case where the NOA-81 sticker 18 is made by capillary technique is not represented). The UV treatment of the partially insulated NOA-81 16b, 20b allows finishing the insulation of NOA-81 and gives a totally insulated NOA-81 16c, 20c allowing the sealing of the lower part 23 with the upper part 24.

Two well-known types of electrode design can be used to form the ground and high-voltage electrodes: metal deposition technique [2] or microsolidics technique [3]. However, other methods for manufacturing electrodes could be envisaged.

A method to form the electrode by metal deposition technique is illustrated on FIG. 7A.

First of all, a substrate 25 (e.g. a glass slide) covered with a positive photoresist thin layer 26 (e.g. S1813) is provided (it can be prepared notably by evenly spreading the positive photoresist on the substrate by spin-coating, followed by a hard bake of about 60 s at about 115° C.). The positive photoresist thin layer 26 on the substrate 25 is exposed to UV light at the desired wavelength though a patterned mask 27 comprising transparent parts (corresponding to the scheme of the electrode(s)) and black parts, so that only the areas of the photoresist thin layer 26 placed under the transparent parts of the mask 27 are exposed to UV light. The photoresist is then developed so that exposed areas are dissolved in the developer and washed away. Once the mask's pattern is 'copied' onto the substrate 25 with the positive photoresist 26, various depositions methods (physical vapor evaporation deposition, sputtering methods, etc.) can be used to deposit a thin film of conductive material 28 (e.g. ITO—Indium Tin Oxide) on the substrate 25 and the positive photoresist 26. For example, the deposition of ITO thin film can be made via magnetron sputtering. For that, the patterned photoresist along with the substrate are put on the substrate holder in the magnetron sputtering chamber and a thin film of ITO is uniformly deposited on the substrate. After deposition of the conductive material 28, the photoresist layer 26 is removed with the thin film of conductive material 28 on it, whereas the conductive material 28 deposited directly on the substrate 25 is left on the substrate 25, forming thus the desired electrode(s). After a thermal annealing, the substrate comprising a patterned conductive material thin film can be then used as a substrate for the fabrication of the support according to the invention comprising various channels which can be prepared as disclosed previously using NOA-81 as a dielectric material as illustrated on FIG. 6. In this case, the substrate comprising a patterned conductive material thin film can be the substrate 17 or 19 of FIG. 6. In these conditions, the electrodes made via deposition can be placed above and below the main channel.

Figure 7B:
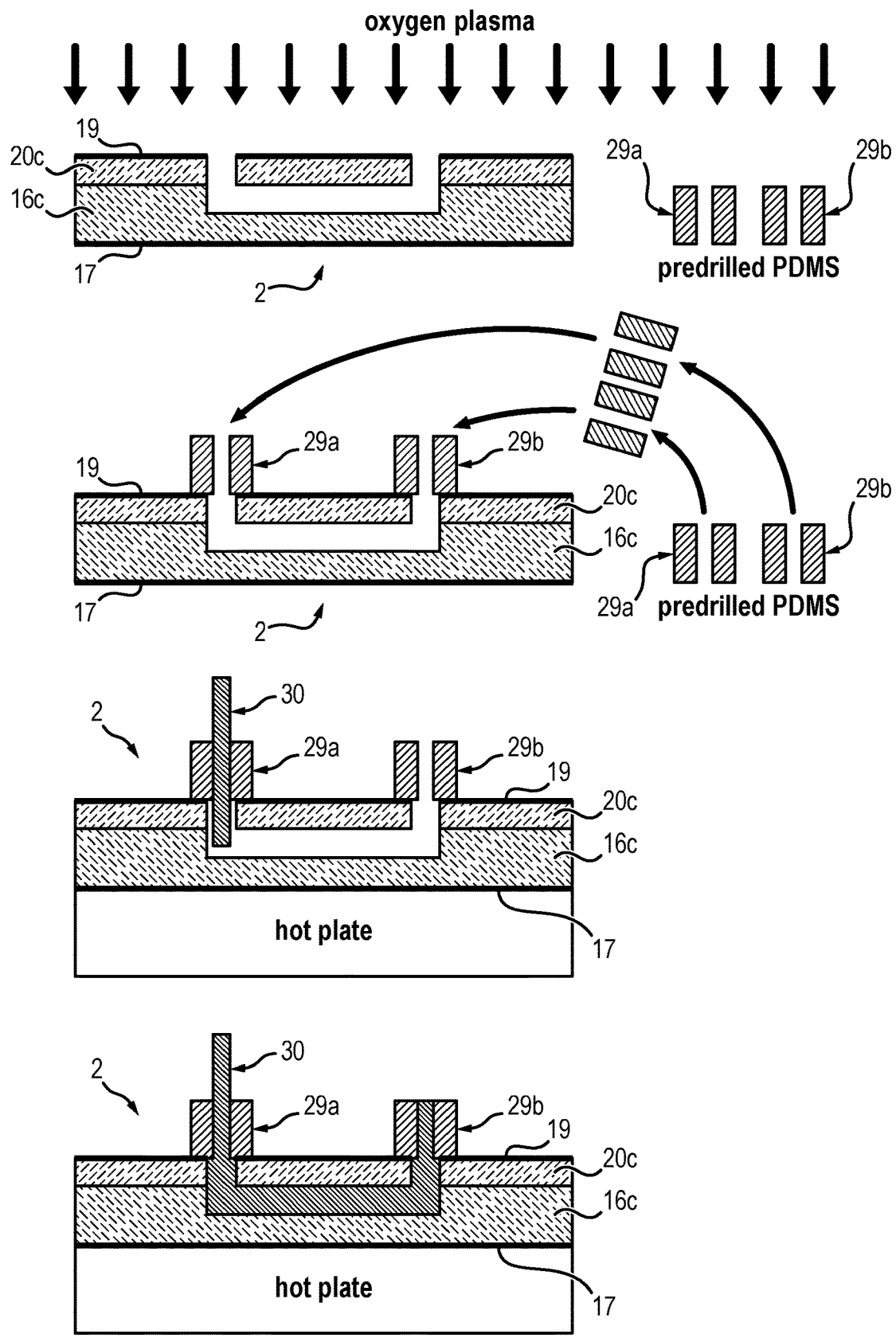

A method to form the electrode by microsolidics technique, method used in the examples of the present patent application, is illustrated on FIG. 7B.

For this method, the ground and high-voltage electrodes embedded in the dielectric material of the support are formed by first forming a channel in the support, for example by a method indicated above and notably illustrated on FIG. 6, before filling this channel with the electrical conductor material of the electrode. For that, it is preferable to use a predrilled upper part to form the channel so that it will be possible to fill the channel by a hole located in the upper part area above the channel.

For that, a support 2 containing a channel made for example according to FIG. 6 (for ex. FIG. 6C1) and pre-drilled pieces (for ex. cubes) of PDMS 29a, 29b (for ex. with a hole having a diameter comprised between 0.75 mm and 1 mm) are placed in a plasma cleaner, notably for 30 s to 2 min), for an oxygen plasma treatment. This oxygen plasma allows the activation of the PDMS surface so that it is possible to stick the activated surface of the predrilled PDMS pieces 29a, 29b on the support 2 (for ex. on the glass surface of the support). The hole of the predrilled PDMS pieces 29a, 29c has to be connected to a hole of the upper part of the support 2 so has to be able to fill the channel with the conductive material 30 through these holes and to form the electrode. The support 2 is then placed on a hot plate (for ex. at 200° C.) and a wire of the conductive material 30 having a low melting point is introduced in the channel by the hole of the predrilled PDMS piece 29a and the hole of the upper part of the support 2. Under heat, the conductive material 30 melts and fills the channel by capillarity. When the melted conductive material 30 appears at the other extremity of the channel by the hole of the second predrilled PDMS piece 29b, the wire is removed. After cooling, the conductive material 30 hardens and forms the electrode. Connector cables can be added in the holes of the predrilled PDMS pieces if necessary. With this method, the electrodes are placed on both sides of the main channel and not above and below as with the deposition method.

Method of Generation of a Plasma

The microfluidic or millifluidic device according to the invention can be used for the generation of plasma in a continuous manner in the gas bubbles which flow into the liquid through the main channel.

The present invention relates thus also to a method for generating a plasma in a continuous manner using the microfluidic or millifluidic device according to the invention and comprising the steps of:

(a) providing a liquid and making the said liquid circulating through the main microchannel or millichannel of the microfluidic or millifluidic device, (b) providing a gas and making bubbles of said gas in the said liquid so that the gas bubbles circulate with the liquid through the main microchannel or millichannel of the microfluidic or millifluidic device, (c) applying a high voltage between the high-voltage electrode(s) and the ground electrode(s) so as to generate a plasma in the bubbles circulating through the main microchannel or millichannel of the microfluidic or millifluidic device.

The microfluidic or millifluidic device according to the invention allows forming a flow of gas bubbles in a liquid phase inside the main channel of the support, notably under pressurized conditions. The high-voltage and ground electrodes located on opposite sides of the main channel and extending along the main channel allows generating a high voltage electric field inside the main channel. A plasma can thus be generated, in a continuous manner, in the gas bubbles circulating in the main channel due to the generation of an electric field inside the main channel, and more particularly dielectric-barrier discharges (DBD).

By generation of plasma in the gas bubbles "in a continuous manner" is meant in the framework of the present invention that the bubbles remain in a plasma state all along their travel in the main microchannel or millichannel 3 between the ground and high-voltage electrodes.

The use of a microfluidic or millifluidic device according to the invention allows:
 a hydrodynamic control, notably of the size, the circulation speed and the frequency of generation of the bubbles in order to have an homogenous and reproducible system, and
 a control of the electric discharge with a control of the quantity and the frequency of the energy injected in the bubbles which allows controlling the nature and concentration of the reactive species formed in the plasma.

The high voltage is typically comprised between 1 kV and 30 kV, notably between 5 kV and 20 kV, preferably between 10 kV and 15 kV.

According to a first embodiment, the high voltage will be a variable voltage, in particular sinusoidal, with a frequency comprised advantageously between 1 Hz and 10 MHz, in particular comprised between 100 Hz and 1 MHz, preferably comprised between 100 Hz and 10 kHz. This allows generating electrical micro-discharges in the gas bubbles at a precise frequency. Advantageously, this frequency will be adapted to the conditions of the experiment, such as the nature of the gas, the circulation speed of the bubbles, the kinetics of target reactions, etc. In this case, the high voltage (peak to peak voltage) is typically comprised between 1 kV and 30 kV, notably between 5 kV and 20 kV, preferably between 10 kV and 15 kV.

According to a second embodiment, the high voltage is pulsed. In this case, the applied voltage is high only during pulses of short duration, typically 0.001 to 1 microseconds, with a frequency comprised advantageously between 1 Hz and 10 MHz, in particular comprised between 100 Hz and 1 MHz, preferably comprised between 100 Hz and 10 kHz. In this case, the high voltage (peak to peak voltage) is typically comprised between 1 kV and 30 kV, notably between 5 kV and 20 kV, preferably between 10 kV and 15 kV.

The high voltage will be provided by a high-voltage power source connected to the ground electrode(s) (4) and the high-voltage electrode(s) (5) as mentioned previously.

The gas used for this method is any gas allowing the generation of a plasma under high-voltage conditions, such as air, argon, helium, nitrogen, oxygen, water vapour or a mixture thereof, and preferably air, argon, helium, nitrogen or a mixture thereof. The use of a gas phase confined in small gas bubbles allows the use of a gas other than air, as well as the control of the generated reactive species.

The width and the height of the gas bubbles circulating in the main channel will depend on the width and depth of the main channel. The width/height of the gas bubbles will be generally smaller than respectively the width/depth of the main channel. The length of each of the gas bubbles will be advantageously comprised between 1 µm and 10 mm, notably between 10 µm and 5 mm, preferably between 100 µm and 3 mm. More particularly the length of each of the gas bubbles circulating in a main microchannel will be advantageously comprised between 1 and 1000 µm, notably between 10 and 500 µm, preferably between 100 and 300 µm and the length of each of the gas bubbles circulating in a main millichannel will be advantageously comprised between 1 and 10 mm, notably between 1 and 5 mm, preferably between 1 and 3 mm. Advantageously, the gas bubbles have substantially the shape of a sphere or of a flattened sphere.

It is however preferable to have smaller bubbles in order to increase the ratio volume/surface of the bubbles so as to maximize the mass transfer efficiency between the gas and the liquid phase.

These gas bubbles can flow with the liquid in the main channel notably by means of a pressure applied at the inlets of the support of the device. This pressure is advantageously comprised between 1 bar and 2 bars (100-200 kPa).

The method according to the invention is advantageously performed at room temperature, i.e. at a temperature comprised between 15 and 40° C., preferably between 20 and 30° C., notably at around 25° C. However, the method could be used to other temperatures if need be.

The plasma formed in gas bubbles is a gas partially ionised comprising molecules and atoms, generally in excited states, ions, electrons, free radicals, etc. The plasma contains thus reactive species such as ions ($O_2^-$, $Ar^+$, etc.) or free radicals (OH°, O°, NO°, etc.). These reactive species can then react together to form new molecules which can be transferred into the liquid or on the contrary the reactive species can be transferred directly into the liquid to react with reagents present in the liquid to form new molecules. The device according to the invention can thus be used for chemical synthesis, and more particularly for the synthesis of organic molecules.

Figure 8:
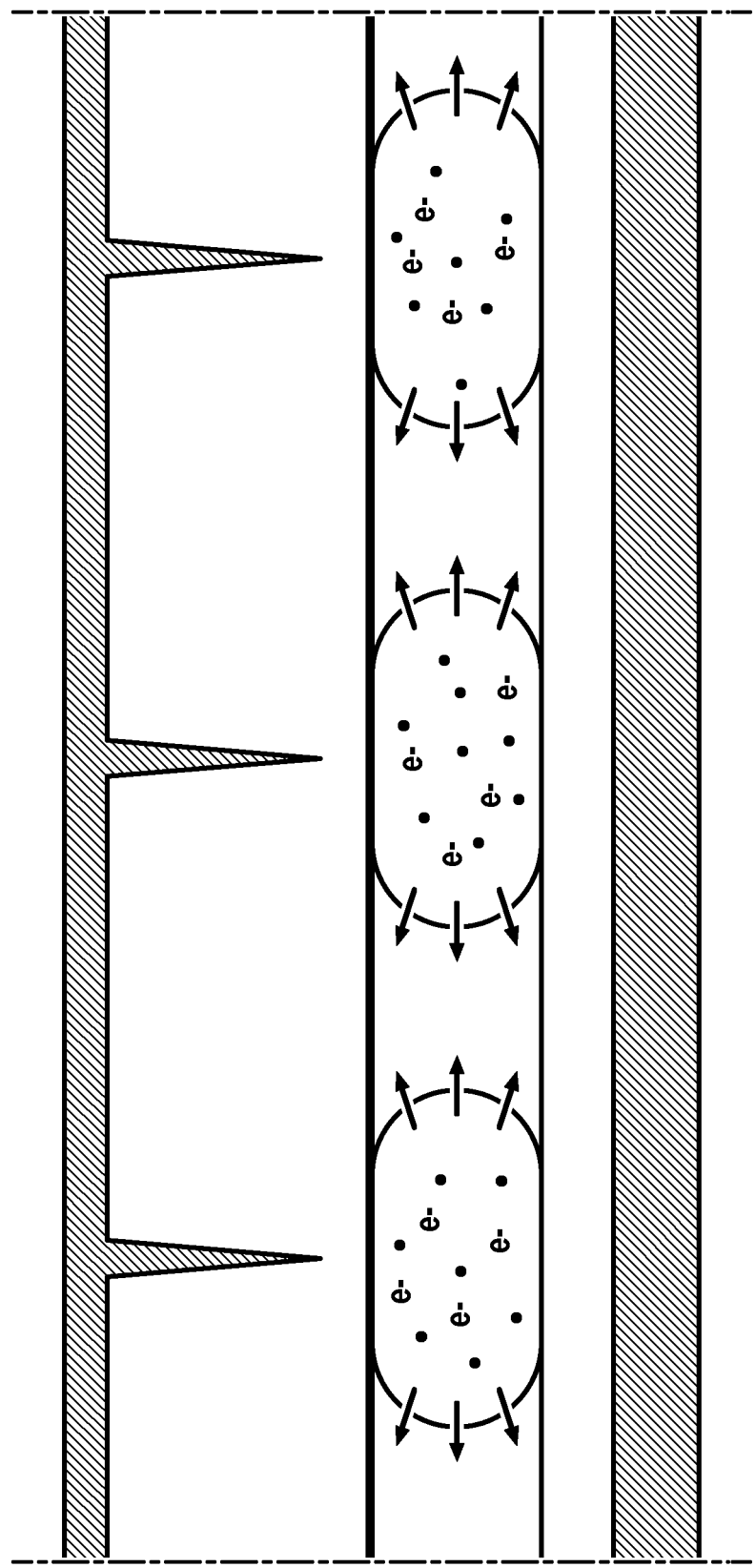

The method according to the invention is illustrated on FIG. 8 which shows a flow of gas bubbles in a liquid phase in the main channel, said main channel being surrounded by the high voltage and ground electrodes in a point-to-plane configuration. The dielectric-barrier discharges created between the two electrodes allows generating a plasma comprising reactive species represented as electrons ($e^+$) and free radicals (·). These reactive species (or the molecules formed in the bubbles with these reactive species) can then be transferred into the liquid as represented by the arrows.

In the method according to the invention, the gas bubbles in which are generated the reactive species are in vicinity of the liquid phase. The loss of reactive species (which have generally a short half-life) during the transfer from the gas bubbles to the liquid is thus minimized in the method according to the invention since the plasma (i.e. the reactive species) are continuously generated.

The liquid can comprise various components such as one or several solvents and/or one or several reagents.

The solvent can be any solvent commonly used in organic chemistry such as water, an aliphatic hydrocarbon (pentane, hexane, cyclopentane, cyclohexane), an aromatic hydrocarbon (benzene, toluene), an alcohol (methanol, ethanol, n-propanol, isopropanol, n-butanol, iso-butanol, tert-butanol), an ether (1,4-dioxane, diethyl ether, tetrahydrofurane (THF)), an ester (ethyl acetate), a ketone (acetone), a halogenated solvent (chloroform, dichloromethane, dichloroethane), dimethylsulfoxide (DMSO), acetonitrile, dimethylformamide (DMF), or a mixture thereof. In particular, it can be water or an alcohol (such as methanol, ethanol, n-propanol, isopropanol, n-butanol, iso-butanol or tert-butanol) or a mixture thereof.

The reagent can be any reagent which can be used in organic chemistry, for example a monomer. It could be notably methyl methacrylate (MMA), phenol, etc. The reagent could be used alone, without any solvent, if it is in a liquid form at the operating temperature.

EXAMPLES

Example 1

Materials and Methods

The thiol-ene based resin NOA-81 (Norland Optical Adhesive) has been mainly used to prepare the microfluidic or millifluidic devices according to the invention. This resin has been chosen over traditionally used PDMS (polydimethylsiloxane) for its good physical, chemical, electrical and optical properties: i) unlike PDMS devices, NOA-81 microreactors are impermeable to gas such as air and water vapor, which ensures a closed environment for plasma [1]; ii) cured NOA-81 has a high elastic modulus (typically 1 GPa), which avoids sagging effects [1]; iii) NOA-81 appears less sensitive to solvent swelling effects than PDMS [1]; iv) the dielectric constant of NOA-81 being 4.05 at 1 MHz, it is as well a performant insulating material; v) with a high transmittance in the visible and near-UV range, NOA-81 makes it possible for in situ discharge diagnostics (Optical Emission Spectroscopy (OES) or Ultra-rapid camera measurements). Owing to these properties, NOA-81 is a good candidate for the fabrication of plasma microreactors or millireactors.

Figure 9:
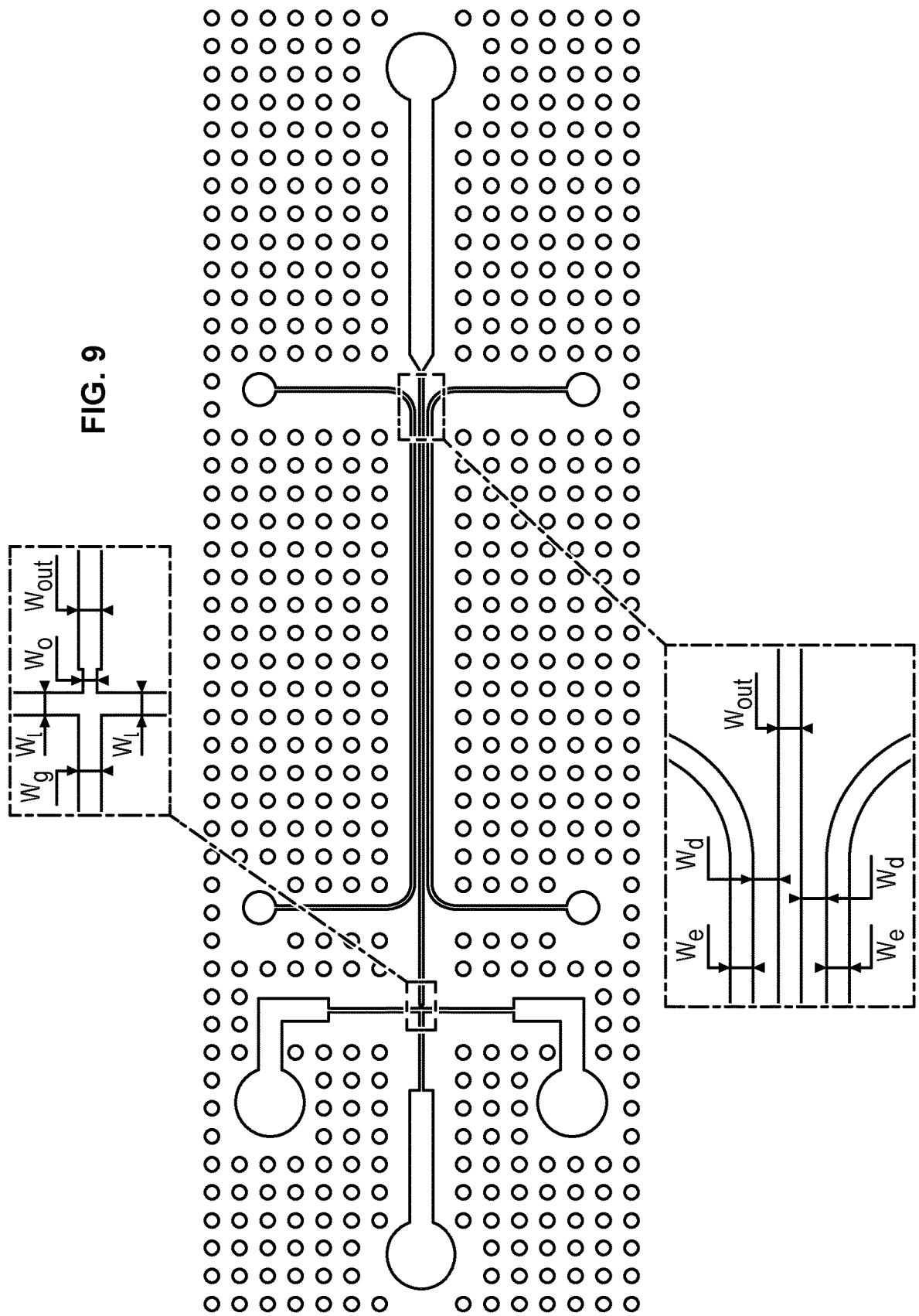

A support has been prepared as illustrated on FIGS. 6A, B1 and C1 and detailed in the description, The geometry of the support used is represented on FIG. 9, the small circles representing the tiny pillars used to form the PDMC mold. It corresponds to a support with a flow focusing design for the generation of gas bubbles. The dimensions of channels used in this experiment were as follow: $W_g$=240 µm, $W_l$=240 µm, $W_o$=120 µm, $W_{out}$=240 µm, $W_d$=120 µm, $W_e$=240 µm.

The ground and high voltage electrodes have been made with an alloy of 52% In and 48% In (Indium Corporation of America) with a plane-to-plane configuration according to the method illustrated on FIG. 7B and detailed in the description.

FIG. 9 illustrates the complete device used for the observation of plasma discharges. The two electrodes of the microreactor were connected to a high voltage source and the ground respectively. Sinusoidal waves generated by a function generator were magnified by a signal amplifier (Trek, 20/20C) to several tens of thousands of volts. The pressure controller (Fluigent, MCFS-EZ system, France), regulated by the computer, gives rise to a stable bubble generation within the flow-focusing geometry. A current probe was placed between the microreactor and the ground connection, in order to electrically detect plasma discharges. An iCCD camera (Pimax4, Princeton Instruments) was triggered by the function generator to collect images of plasma discharges through a macroscope (Leica Z16 APO). A dark environment is indispensable for the detection of weak optical emission of electrical discharges.

The liquid chosen was deionized water, while the working gas was Argon. The driving pressures for the liquid phase and for the gas phase were 88 mbar and 86 mbar (8.8 and 8.6 kPa) respectively.

The high voltage was increased progressively till an electrical discharge is observed. In this case, the Pk-Pk tension is 12.51 kV with a frequency of 228 Hz.

Results

Figure 10:
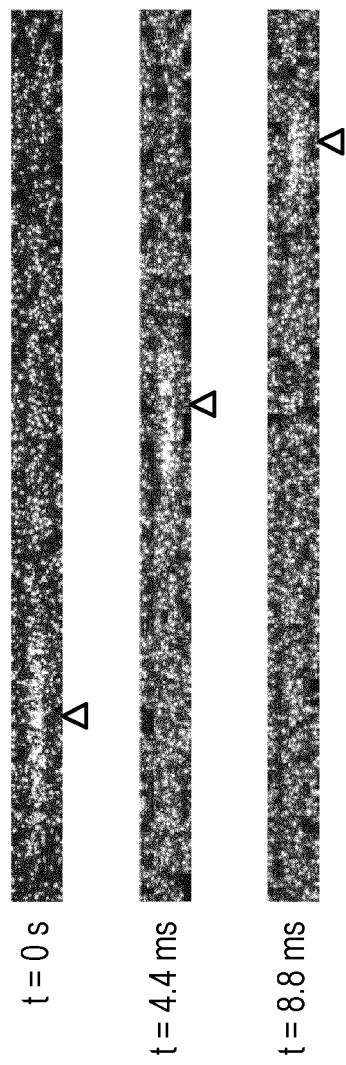
FIG. 10 shows a photograph of plasma discharges observed within bubbles in the device used in the examples.

FIG. 10 shows the primary results of plasma discharges within bubbles passing in the main channel through the two electrodes. Plasma bubbles were observed as illuminating segments during the experiment, moving through the microchannel.

Example 2

Material and Methods:

To quantify the transfer of radical species from plasma bubbles to liquid phase, EPR (Electron Paramagnetic Resonance) experiments were performed. For these experiments, the argon bubbles were immobilized in cavities positioned along the main channel where liquid flows. With this geometry, the liquid residence time was easier to control. The experiments were carried out with a liquid flow of 10 µL/min. In these conditions the exposure time to plasma was 0.9 s and the ratio S/V corresponding to the surface exposed to the plasma phase and the liquid volume was 2000 $m^2/m^3$.

The liquid phase was deionized water containing 0.4 mol/L of 5,5-dimethyl-pyrroline N-oxide (DMPO) which is a commonly used spin-trap.

The high voltage was increased progressively till an electrical discharge is observed. In this case, the Pk-Pk tension is 3 kV with a frequency of 2 kHz.

The liquid phase carrying the spin trap passed through the main channel and captured radials initially produced in the plasma bubbles immobilized in the cavities. The reacted solution was then collected at the outlet of the reactor and the product mixture went through the EPR spectrometer at the end of the experiment after 30 minutes. A reference experiment was carried out with the same DMPO solution passing through the reactor without the plasma discharge.

Figure 11:
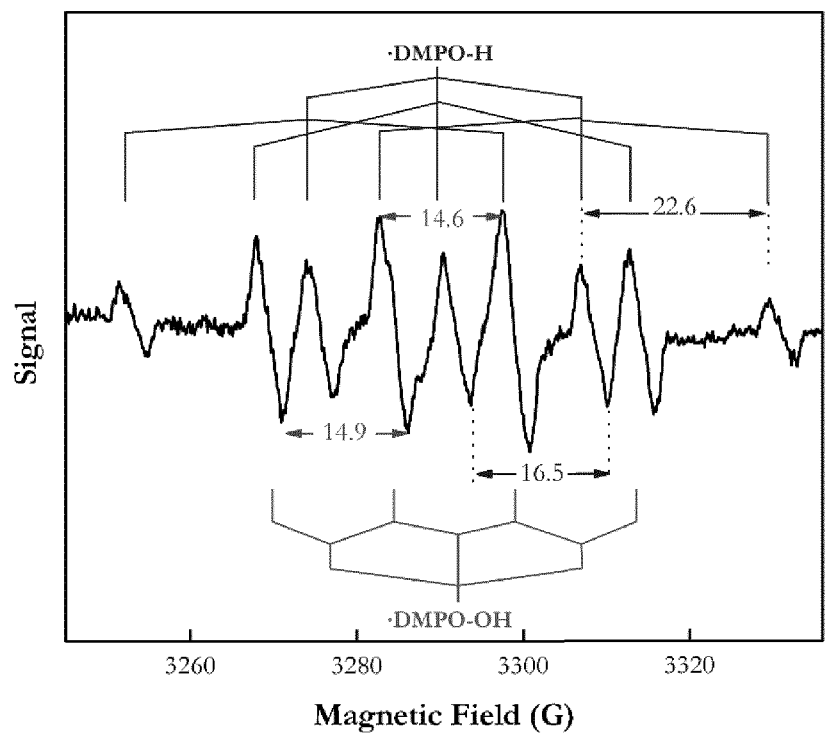
FIG. 11 shows the EPR signal of the collected liquid obtained in the experiment of example 2 and FIG. 12 shows the comparison between the simulated spectra and the measured spectra. This demonstrates the transfer into the liquid flow of reactive species formed in the plasma bubbles.

Results:

FIG. 11 shows the EPR spectra of the collected liquid. It indicates the presence of .DMPO-OH and .DMPO-H, whereas no significant signal was detected with the reference sample.

To further confirm the presence of these two radicals, a spectra simulation has been conducted with a public EPR software (Winsim v.1.0, 2002). Winsim is a specialized program to compute the simulations of multiple species of freely rotating isotropic free radicals in complex systems. The software and the database are provided by National Institute of Environmental Health Sciences of USA (NIEHS). The simulation parameters are as presented in Table 1.

TABLE 1

| Parameters for the EPR spectra simulation | |
|---|---|
| General parameters | |
| Number of species | 2 |
| Calculation type | simple |

TABLE 1-continued

Parameters for the EPR spectra simulation

Species n°1 (•DMPO-OH)

| Area | 44.622 |
|---|---|
| g-shift | 1.28 |
| Lineshape | 0 |
| Simple LW | 1.314 |

| nuclei | hyperfine | spin | number |
|---|---|---|---|
| 1 | 14.725 | 0.5 | 1 |
| 2 | 14.848 | 1 | 1 |

Species n°2 (•DMPO-H)

| Area | 55.378 |
|---|---|
| g-shift | 1.677 |
| Lineshape | 0 |
| Simple LW | 1.347 |

| nuclei | hyperfine | spin | number |
|---|---|---|---|
| 1 | 22.511 | 0.5 | 2 |
| 2 | 16.421 | 1 | 1 |

Figure 12:
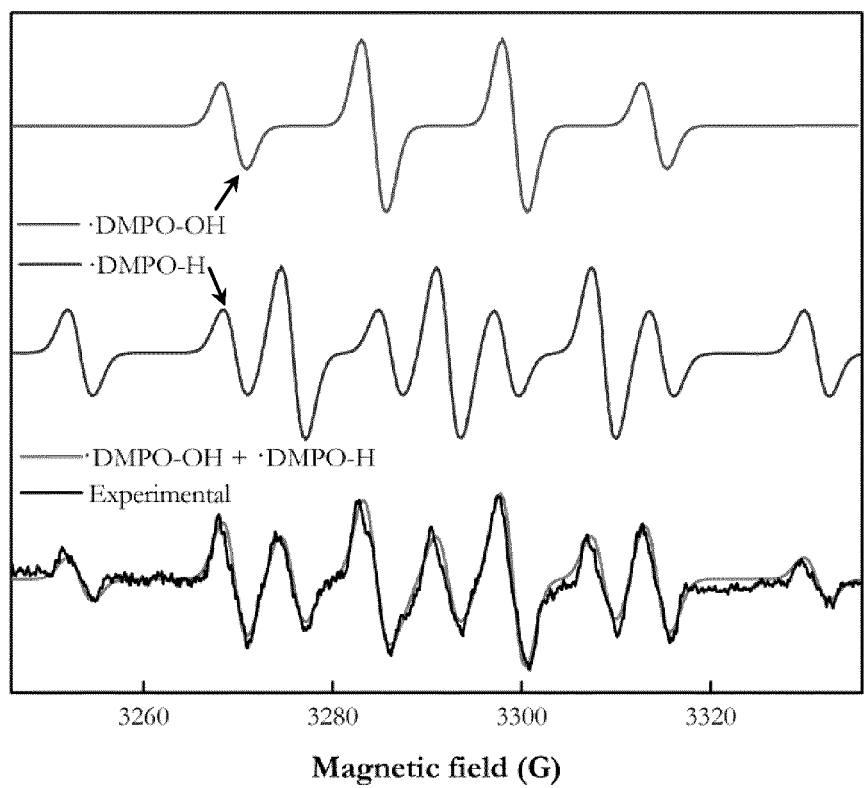

FIG. 12 compares the simulated signals with the EPR spectra obtained from experimental results. The high resemblance between the simulated spectra and the measured spectra validate that .DMPO-OH and .DMPO-H were detected in the liquid phase. The concentration ratio of .DMPO-OH and .DMPO-H can also be calculated by comparing the area of the two species based on the simulation (Table 1), which is around 0.8.

REFERENCES

[1] D. Bartolo, G. Degré, P. Nghe, V. Studer, "Microfluidic stickers", *Lab. Chip*, vol. 8, no 2, p. 274-279, janv. 2008.
[2] G. Schelcher, C. Guyon, S. Ognier, S. Cavadias, E. Martinez, V. Taniga, L. Malaquin, P. Tabeling, M. Tatoulian, "Cyclic olefin copolymer plasma millireactors", *Lab. Chip*, vol. 14, no 16, p. 3037-3042, août 2014.
[3] A. C. Siegel, S. S. Shevkoplyas, D. B. Weibel, D. A. Bruzewicz, A. W. Martinez, et G. M. Whitesides, "Cofabrication of Electromagnets and Microfluidic Systems in Poly(dimethylsiloxane)", *Angew. Chem.*, vol. 118, no 41, p. 7031-7036, October 2006.
[4] P. Garstecki, I. Gitlin, W. DiLuzio, G. M. Whitesides, E. Kumacheva, H. A. Stone, "Formation of monodisperse bubbles in a microfluidic flow-focusing device", *Appl. Phys. Lett.*, vol. 85, no 13, p. 2649-2651, September 2004.
[5] M. A. Malik, "Water Purification by Plasmas: Which Reactors are Most Energy Efficient?", *Plasma Chem Plasma Process*, vol. 30, no 1, p. 21-31, November 2009.
[6] T. Yano, I. Uchiyama, F. Fukawa, K. Teranishi, and N. Shimomura, "Water Treatment by Atmospheric Discharge Produced with Nanosecond Pulsed Power", in *IEEE International Power Modulators and High Voltage Conference, Proceedings of the 2008*, 2008, pp. 80-83.
[7] Y. Matsui, N. Takeuchi, K. Sasaki, R. Hayashi, K. Yasuoka, "Experimental and theoretical study of acetic-acid decomposition by a pulsed dielectric-barrier plasma in a gas-liquid two-phase flow", Plasma Sources Sci. Technol. 20 (2011) 034015 (11 pp).
[8] Y. Yamanishi, S. Sameshima, H. Kuriki, S. Sakuma, F. Arai, "Transportation of mono-dispersed micro-plasma bubble in microfluidic chip under atmospheric pressure", Transducers 2013, Barcelona, SPAIN, 16-20 Jun. 2013.
[9] US 2006/0034736.
[10] US 2008/0108122.
[11] GB 2 466 664 A.

The invention claimed is:

1. A method for generating a plasma in a continuous manner using a microfluidic or millifluidic device comprising:
   a support made at least partially of a dielectric material, the support comprising a first inlet, a second inlet, an outlet, and a main microchannel or millichannel present in the dielectric material, a first injection channel connecting the first inlet to the main microchannel or millichannel, a second injection channel connecting the second inlet to the main microchannel or millichannel, the first injection channel and the second injection channel meeting the main microchannel or millichannel at a junction,
   one or several ground electrode(s) embedded in said dielectric material and extending along the main microchannel or millichannel, and
   one or several high-voltage electrode(s) embedded in said dielectric material and extending along the main microchannel or millichannel,
   wherein the high-voltage electrode(s) and the ground electrode(s) are located on opposite sides of the main microchannel or millichannel so as to be able to generate an electric field inside the main microchannel or millichannel,
   the method comprising the steps of:
   (a) providing a flow of pressurized liquid through the second inlet so that the pressurized liquid circulates from the second inlet, through the junction and the main microchannel or millichannel of the microfluidic or millifluidic device to the outlet,
   (b) providing a gas through the first inlet through the junction into the main microchannel or millichannel and producing bubbles of the gas at the junction in the pressurized liquid so that the gas bubbles circulate within the flow of the pressurized liquid through the main microchannel or millichannel of the microfluidic or millifluidic device,
   (c) applying a high voltage between the high-voltage electrode(s) and the ground electrode(s) so as to generate a plasma in the bubbles circulating through the main microchannel or millichannel of the microfluidic or millifluidic device, wherein the high voltage is between 1 kV and 30 kV.

2. The method according to claim 1, wherein the gas is selected from air, argon, helium, oxygen, nitrogen, water vapour and a mixture thereof.

3. The method according to claim 1, wherein the pressurized liquid is selected from solvents, reagents, or a mixture thereof.

4. The method according to claim 1, wherein producing bubbles of the gas in the pressurized liquid produces bubbles having a length between 1 µm and 10 mm.

5. The method according to claim 1, wherein the high voltage is a variable high voltage or the high voltage is a pulsed voltage.

6. The method according to claim 1, wherein the width and the depth of the main microchannel or millichannel are comprised between 1 µm and 10 mm.

7. The method according to claim 1, wherein the dielectric material is a UV-cured polymer, a poly(tetramethylene succinate), a cyclic olefin copolymer (COC), glass or a combination thereof.

8. The method according to claim 1, wherein the support comprises a third inlet.

9. The method according to claim 8, wherein the support also comprises:
- a third injection channel connecting the third inlet to the main microchannel or millichannel, wherein the first injection channel, the second injection channel, and the third injection channel meet the main microchannel or millichannel at the junction, and
  - wherein, at said junction, each of the second and third injection channels extends perpendicularly relative to the first injection channel, the second injection channel and the third injection channel being a continuation of each other.

10. The method according to claim 1, wherein the microfluidic or millifluidic device further comprises at least one reservoir configured to contain a liquid, at least one reservoir configured to contain a gas, and at least one receiver container configured to contain a gas and/or a liquid.

11. The method according to claim 1, wherein the ground electrode(s) and the high-voltage electrode(s) are made of indium (In), tin (Sn), copper (Cu), gold (Au) or oxides and/or alloys thereof.

12. The method according to claim 1, wherein the microfluidic or millifluidic device comprises one ground electrode and one high-voltage electrode.

13. The method according to claim 1, wherein the form of the ground electrode(s) and/or the high-voltage electrode(s) is a plane, a zig-zag or a plane with fin(s) and/or tip(s) which extend towards the main microchannel or millichannel.

14. The method according to claim 1, wherein the first injection channel and the second injection channel are both a microchannel or a millichannel.

* * * * *